May 8, 1928.
E. J. HAWKINS
AUTOMOBILE SIGNAL
Filed Sept. 28, 1925
1,668,963
2 Sheets-Sheet 1
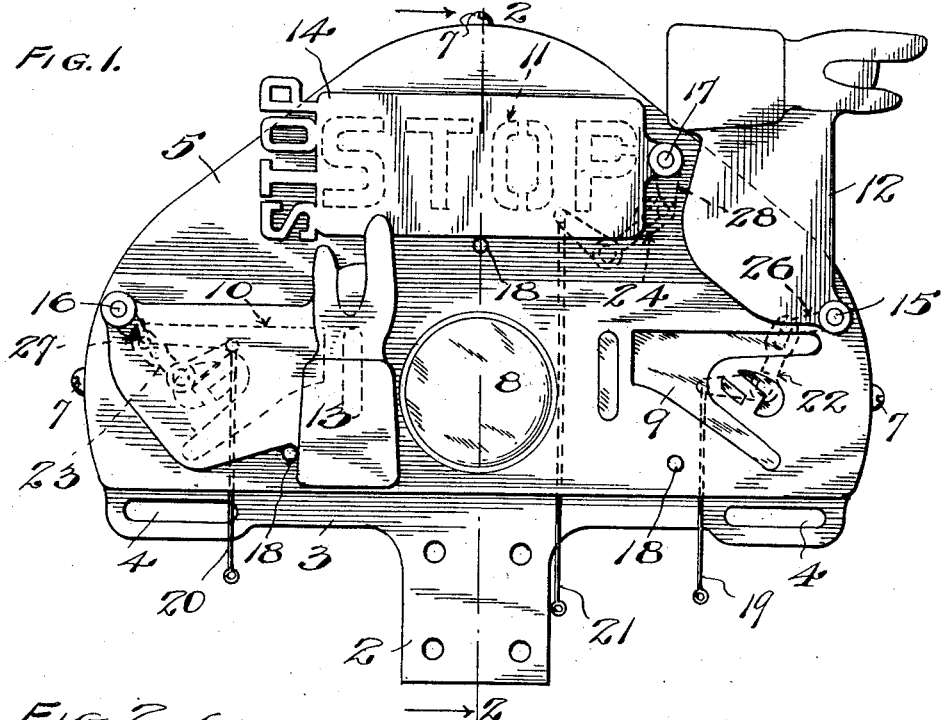
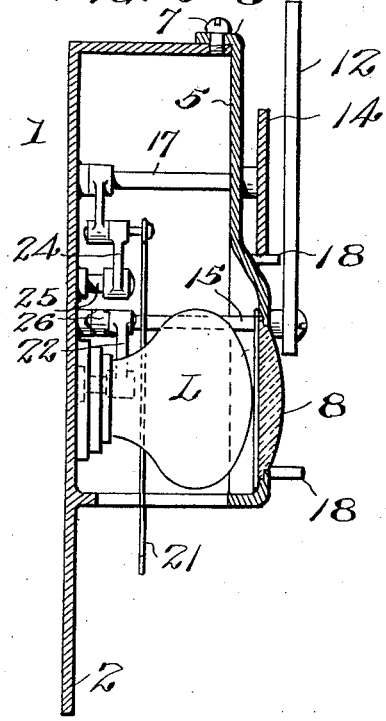
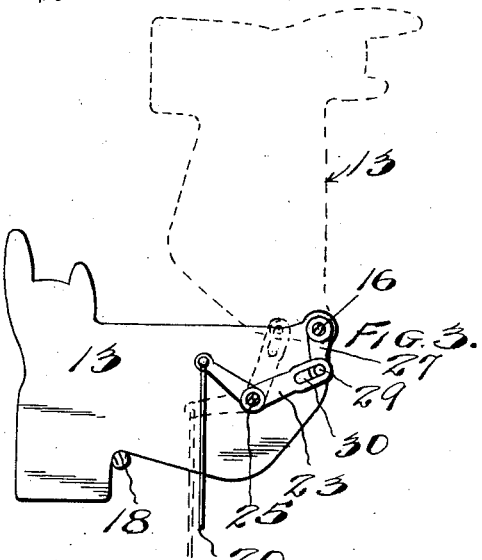
Inventor
EDWARD J. HAWKINS.
Attorney May 8, 1928.
E. J. HAWKINS
1,668,963
AUTOMOBILE SIGNAL
Filed Sept. 28, 1925
2 Sheets-Sheet 2
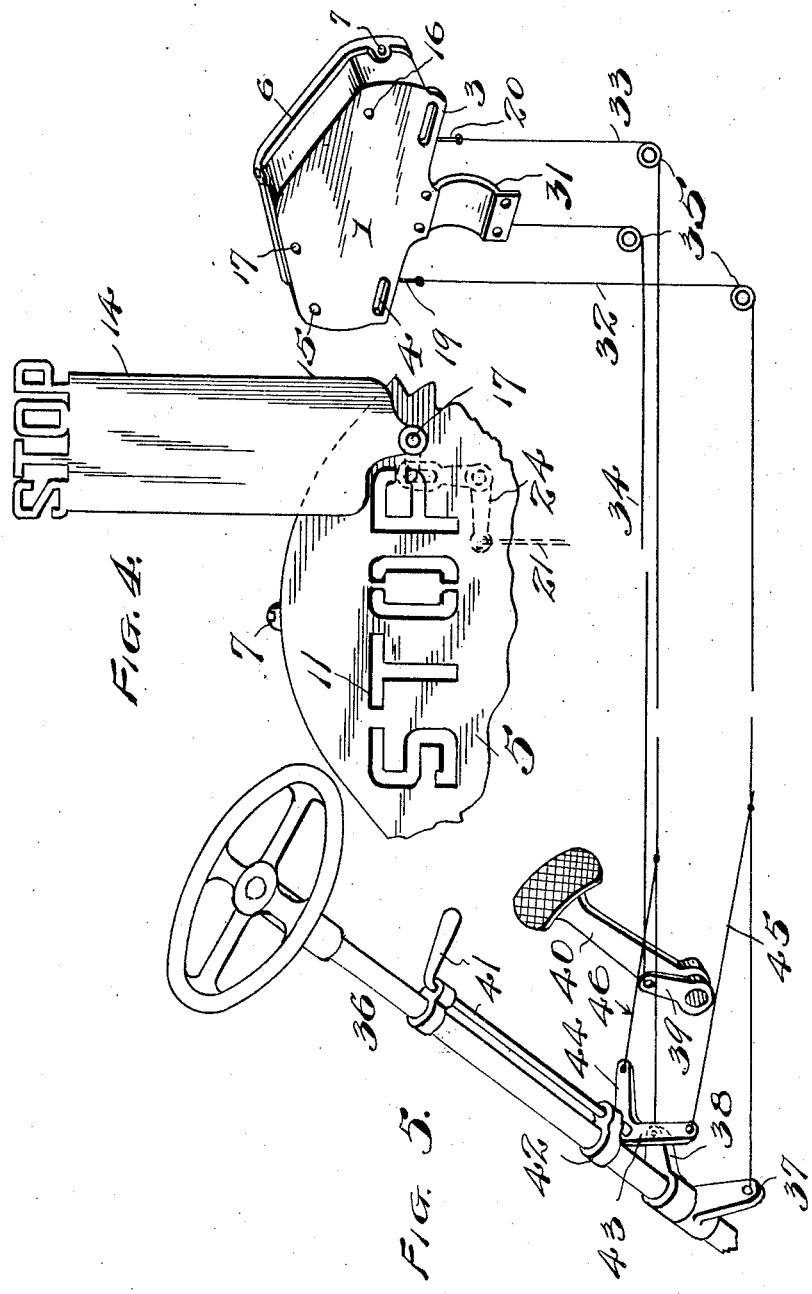
INVENTOR
EDWARD J. HAWKINS
BY 
ATTORNEY Patented May 8, 1928.

1,668,963

UNITED STATES PATENT OFFICE.

EDWARD J. HAWKINS, OF ROME, NEW YORK.

AUTOMOBILE SIGNAL.

Application filed September 28, 1925. Serial No. 59,034.

My present invention relates to improvements in automobile signals of the motion and direction type combined with vehicle controlling mechanism. The signal device as a whole includes means for indicating a right hand turn, a left hand turn, and a stop indicator, and these directions and motion devices are readily discernible by daylight and electrically illuminated at night. The signal box or housing with its indicators may be located at either the front or rear of a motor vehicle and attached to any suitable portion of the vehicle as a support. Means are provided whereby the direction indicators may be utilized in connection with the steering mechanism and the "stop" indicator utilized in connection with the brake pedal, or the indicators may be controlled by means independent of the vehicle control mechanism.

Various arrangements of operative connections may be used between the actuating devices and the signal operating devices in the signal housing whereby the signal may be adapted for use with different types of automobiles. The day signals or indicators are utilized to normally obscure the night indicators, and these illuminated night indicators are selectively uncovered by movement of the day indicators for the performance of their functions at night.

The invention consists in certain novel combinations and arrangements of parts of the day and night indicators as will hereinafter be more fully set forth.

In the accompanying drawings I have illustrated one complete example of the physical embodiment of my invention involving the use of the signal housing at the rear of an automobile wherein the parts are combined and arranged in accordance with one mode I have so far devised for the practical application of the principles of my invention, but is will be understood that various changes and alterations may be made in the exemplified device for adapting it for different uses.

Figure 1 is a view in elevation of the signal as a whole as used at the rear of an automobile with one of the day indicators in active position.

Figure 2 is a vertical transverse sectional view at line 2—2 of Figure 1.

Figure 3 is a detail view of the left hand turn indicator with its operating devices as seen from the rear of Figure 1.

Figure 4 is a detail view of the stop signal.

Figure 5 is a perspective view showing the connection of the signal device with the vehicle control mechanism.

In carrying out my invention as indicated in the drawings where a rear-end signal is illustrated I utilize a metal housing 1 of proper size and shape having an open front that is closed with a detachable cover plate 5. The housing body is fashioned with an integral attaching plate 2 having bolt holes and adapted to be bolted to a suitable support. The plate may be bolted to a bracket rod or bar, or a sectional sleeve may be used instead of the plate and the sleeve bolted to an axle or other part of the vehicle, depending upon the location of the signal.

In Figure 1 the housing is shown with a bottom flange 3 and slots 4 are fashioned therein for bolting the license plate or tag of the automobile in place.

The cover plate or front plate of the housing is fashioned with a flange 6 to fit over the edge of the housing body and several screws 7 are utilized to secure the flanged plate to the housing.

As here shown the signal housing is equipped with a tail light or rear light including the lens 8 affixed in an opening provided therefor in the cover plate and an electric lamp indicated as L is located in the housing in proper position for illuminating the interior of the housing at night.

The cover plate of the housing is equipped with three stationary indicators as 9 10 and 11 to indicate right turns, left turns and "stop" respectively. These indicators are fashioned by coring out openings of suitable shape in the cover plate and closing the openings with colored glass similar to the colored lens 8 of the tail light. Oppositely pointing hands are utilized for the direction indicators and the letters of the word "stop" are formed by openings in the cover plate, which openings are covered with colored glass also.

These glass indicators are normally covered or obscured by means of complementary indicator plates located exterior of the housing and indicated as 12 for a right turn, 13 for a left turn and 14 for "stop". The indicators for direction are preferably fashioned as hand pointers and the "stop" plate also has the word "Stop" cast integral therewith as a visible signal.

When not in active use these indicator plates are disposed horizontally across the front of the housing and they are supported on their respective shafts 15, 16, and 17, and a pin 18 for each of the plates. The pins 18 are affixed to the cover plate and project therefrom in position to receive and support the plates as indicated.

The indicator shafts extend transversely of the housing in which they are journaled and project through the cover plate of the housing, and these shafts are selectively and independently rocked by a pull on the respective links 19, 20 and 21, to swing the indicators to the position of plate 12 in Figures 1 and 2. In this position the indicator 12 may be used during the day for pointing the direction of an intended turn, and the uplifted plate 12 is used at night for permitting the display of the night signal 9. After the turn has been made the plate 12 drops or swings back to normal position out of active use by day, while at night the return of the plate to normal position covers or obscures the illuminated indicator 9 thus rendering this indicator inactive.

Three bell crank levers 22, 23 and 24, each pivoted at 25 in the housing are employed for the respective plates 12, 13 and 14 and the respective shafts 15, 16 and 17 have crank arms 26, 27 and 28 thereon for coaction with the bell crank levers. To provide for the proper movement between the bell crank levers and the crank arms the latter are provided with pins 29 and the former with complementary slots 30, so that when the pull is applied through one of the links as 19, 20 or 21 the selected plate will be swung on its pivot or shaft.

It will be apparent that the window-indicators 9 10 and 11 are normally obscured by the indicator plates, and the windows and plates may be fashioned in various forms as desired. With the plates in horizontal position both the daylight and night signals or indicators are inactive, but by swinging the respective plates to upright position as in Figures 1 3 and 4 the daylight signals become active, and at night the illuminated window-signals or indicators are uncovered for display.

In Figure 5 the semi-circular plate 31 is used with a complementary attaching or clamp plate and bolts for attaching the housing to a rod, bar or other round support.

The respective rods or links 19, 20 and 21 are connected to suitable actuating mechanism in various ways, one of which is illustrated by the use of the cables 32, 33, and 34 which extend forward toward the front of the car and are guided in usual manner as by pulleys 35 located at proper positions.

The right and left direction indicators are controlled from the steering shaft indicated at 36 which is provided with two lever arms 37 and 38 that are connected with the steering apparatus in such manner as to permit only the necessary movement of the lever arms to insure the operation of the signal plates.

The stop signal plate is swung to active position by means of the lever arm 39 which swings with the brake pedal 40 as indicated.

For control of the direction indicators 12 and 13 independent of the steering mechanism an actuating bar 41 which is supported in bearings 42 of the steering apparatus, may be used. This actuating bar is provided with a pair of lever arms 43 and 44 that are connected by cables 45 and 46 to the respective cables 32 and 33.

It will be apparent that various changes and alterations may be made in the adaptation of my invention to different types of automotive vehicles without departing from the principles of my invention.

It will be noticed that the pair of arms 12 and 13 are provided with recess portions which engage the stop pins 18, which limit the downward movement of said arms, while the upper pivoted signal arm is also limited in its downward movement by a stop pin 18, and that the series of three arms are operated through the medium of bell crank lever connections and rods 19, 20 and 21, as most clearly shown in Fig. 1.

Having thus fully described my invention what I claim as new and desire to secure by Letters Patent is—

1. An automobile signal of the character described, consisting of a casing of substantially semi-circular form, a lens in the lower portion of said casing, a signal arm arranged above said lens and pivoted at one end to said casing and formed with a recess, a stop in the casing to engage and limit the downward movement of said arm, a pair of signal arms pivoted to the casing at their upper outer ends and formed with recesses, a pair of stops to limit the downward movement of said arms, bell crank lever connections associated with the pivoted ends of said arms, and manually operated connections for swinging said arms to indicating positions.

2. The herein-described automobile signal consisting of a casing, a lens in the lower portion of said casing, a signal arm arranged above said lens and pivoted at one end to said casing and formed with a recess, a stop in the casing to engage and limit the downward movement of said arm, a pair of signal arms pivoted to the casing at their upper outer end and formed with recesses, a pair of stops to limit the downward movement of said arm, bell crank lever connection associated with the pivoted ends of said arm and formed with slots to accommodate the movement of the connection between said bell crank lever and signal arm connections, and manually operated connections for swinging said arm to indicating position.

In testimony whereof I hereunto affix my signature.

EDWARD J. HAWKINS.